United States Patent
Chen

(10) Patent No.: US 6,909,360 B2
(45) Date of Patent: Jun. 21, 2005

(54) FLASHLIGHT ADAPTED FOR USE WITH A PLASTIC BEVERAGE BOTTLE TO FORM A SIGNALING TORCH

(76) Inventor: Kan-Yi Chen, No. 20, Fen-Yang Rd., San-Min Dist., Kaohsiung City (TW)

( * ) Notice: Subject to any disclaimer, the term of this patent is extended or adjusted under 35 U.S.C. 154(b) by 118 days.

(21) Appl. No.: 10/642,748

(22) Filed: Aug. 19, 2003

(65) Prior Publication Data

US 2004/0032337 A1 Feb. 19, 2004

(51) Int. Cl.[7] ............................................. G08B 23/00
(52) U.S. Cl. ...................... 340/321; 362/186; 362/277; 446/485; 446/219; 340/815.4
(58) Field of Search ............................. 340/321, 815.4; 362/205, 184, 186, 277; 446/485, 219, 405

(56) References Cited

U.S. PATENT DOCUMENTS

| | | | | |
|---|---|---|---|---|
| 1,377,477 A | * | 5/1921 | Hambuechen | 362/205 |
| 4,228,484 A | * | 10/1980 | Johnstone | 362/184 |
| 4,678,450 A | * | 7/1987 | Scolari et al. | 446/405 |
| 4,697,228 A | * | 9/1987 | Mui et al. | 362/352 |
| 5,279,513 A | * | 1/1994 | Connelly | 446/219 |
| 5,595,434 A | * | 1/1997 | Pasch et al. | 362/102 |
| 5,642,931 A | * | 7/1997 | Gappelberg | 362/186 |
| 5,947,789 A | * | 9/1999 | Chan | 446/219 |
| 6,082,876 A | * | 7/2000 | Hanson et al. | 362/293 |
| 6,212,712 B1 | * | 4/2001 | Topp | 5/610 |

* cited by examiner

*Primary Examiner*—Jeffery Hofsass
*Assistant Examiner*—Eric Blount
(74) *Attorney, Agent, or Firm*—Oblon, Spivak, McClelland, Maier & Neustadt, P.C.

(57) ABSTRACT

A barrel of a flashlight has a front barrel portion defining a front receiving space, and a rear barrel portion connected to the front barrel portion and defining a rear receiving space for receiving a battery unit. A lamp is disposed in a reflector retained in the front receiving space of the front barrel portion. A conductor unit is disposed in the barrel and establishes electrical connection between the lamp and the battery unit. A coupling sleeve has a front coupling section formed with an internally threaded surface for engaging an externally threaded mouth of a light-transmissible bottle body of a plastic beverage bottle, a rear coupling section mounted securely on the front barrel portion, and an intermediate section interconnecting the front and rear coupling sections. A lens piece is mounted in the intermediate section of the coupling sleeve.

9 Claims, 3 Drawing Sheets

FLASHLIGHT ADAPTED FOR USE WITH A PLASTIC BEVERAGE BOTTLE TO FORM A SIGNALING TORCH

BACKGROUND OF THE INVENTION

1. Field of the Invention

The invention relates to a flashlight, more particularly to a flashlight adapted for use with a plastic beverage bottle to form a signaling torch.

2. Description of the Related Art

Generally, a conventional flashlight is used for lighting and warning purposes. Furthermore, if plastic beverage bottles, such as polyethyleneterephthalate (PET) bottles, can be used for other purposes, recycling efficiency can be promoted.

Therefore, the object of the present invention is to provide a flashlight adapted for use with a plastic beverage bottle to form a signaling torch.

SUMMARY OF THE INVENTION

According to the present invention, there is provided a flashlight adapted for use with a plastic beverage bottle that includes a light-transmissible bottle body formed with an externally threaded mouth. The flashlight comprises:

a barrel having a front barrel portion that defines a front receiving space, and a rear barrel portion that is connected to the front barrel portion and that defines a rear receiving space adapted for receiving a battery unit;

a reflector disposed in the front receiving space of the front barrel portion;

a lamp disposed in the reflector;

a conductor unit disposed in the barrel and adapted to establish electrical connection between the lamp and the battery unit;

a coupling sleeve having a front coupling section formed with an internally threaded surface that is adapted to engage the externally threaded mouth of the bottle body, a rear coupling section mounted securely on the front barrel portion, and an intermediate section interconnecting the front and rear coupling sections; and a lens piece mounted in the intermediate section of the coupling sleeve.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
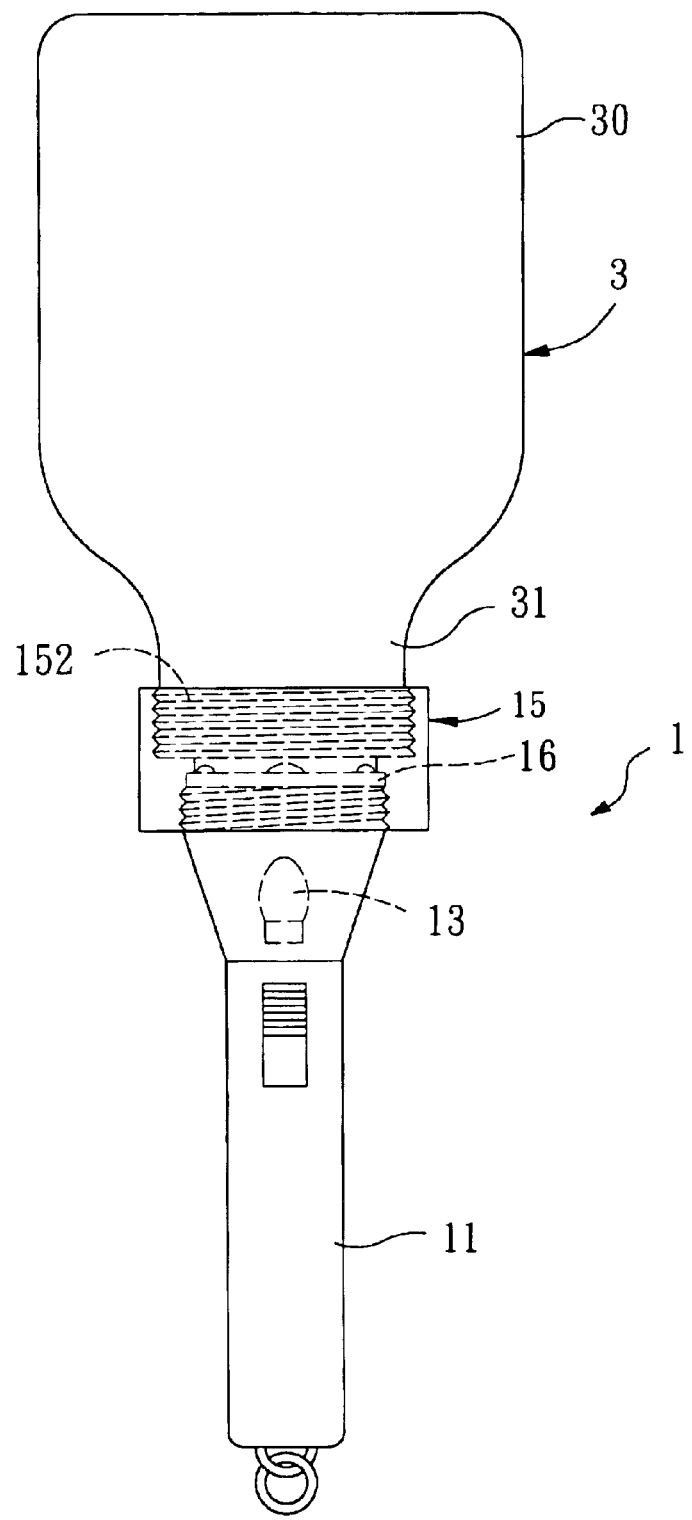
FIG. 1 is a schematic view showing the preferred embodiment of a flashlight for use with a plastic beverage bottle according to the present invention.
Figure 2:
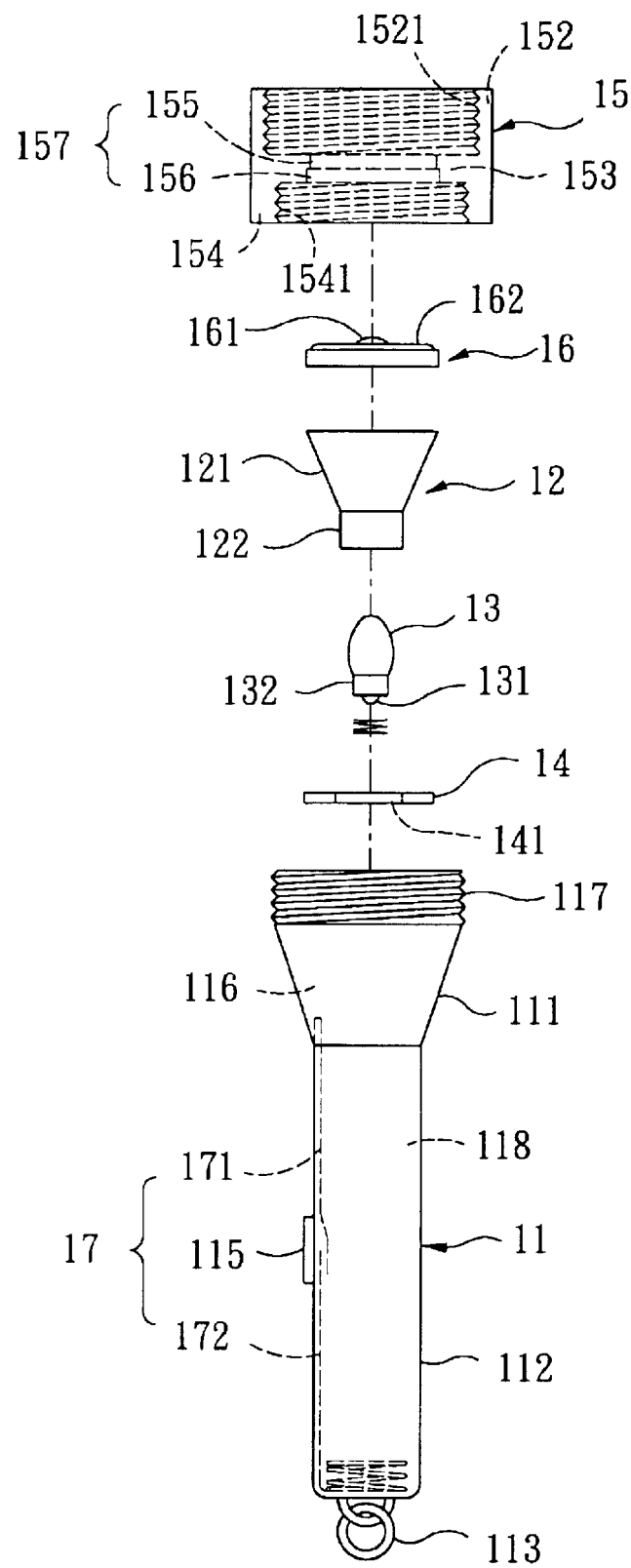
FIG. 2 is an exploded view showing the preferred embodiment.
Figure 3:
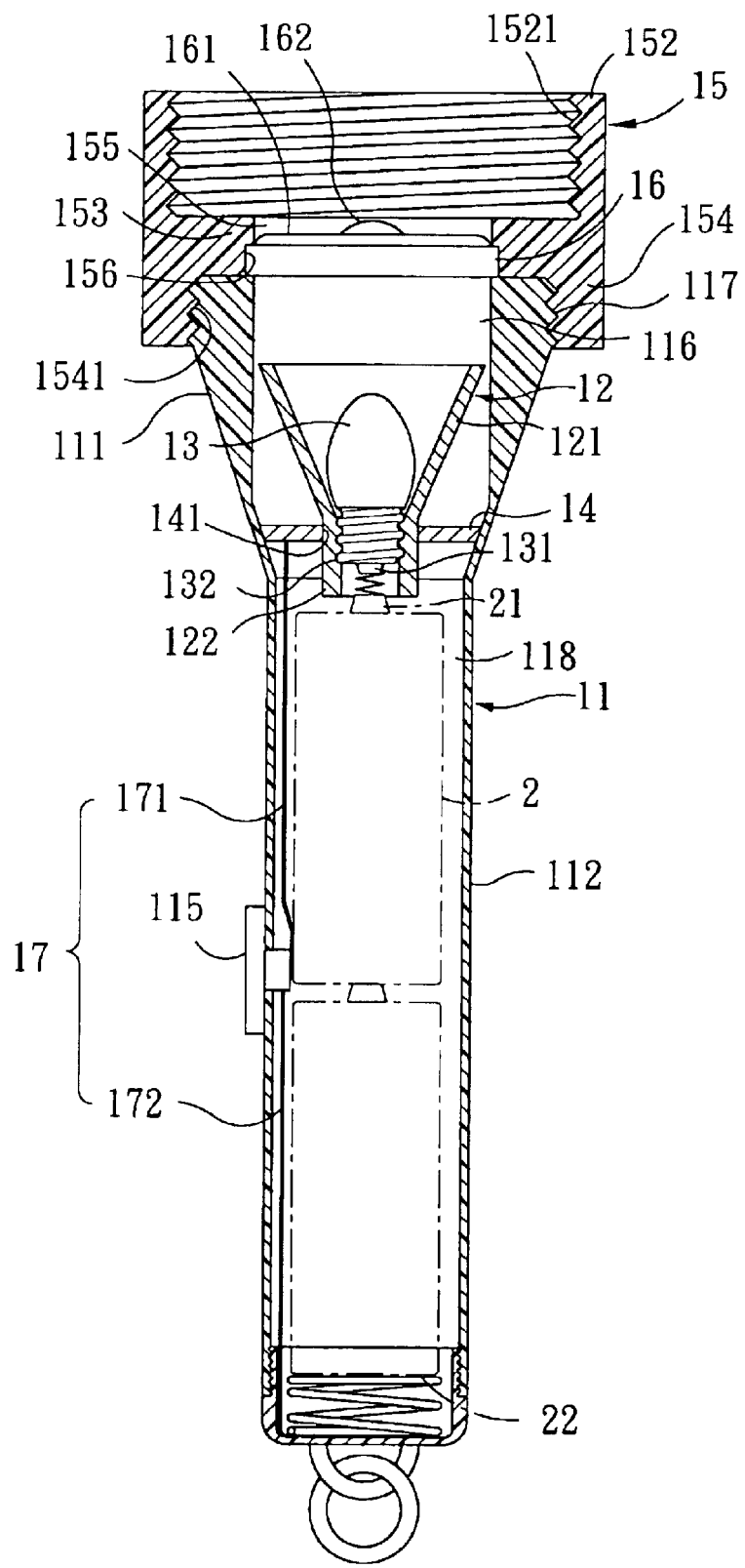
FIG. 3 is a schematic sectional view showing the preferred embodiment.

Referring to FIGS. 1 to 3, the preferred embodiment of a flashlight 1 according to the present invention is shown to be adapted for use with a plastic beverage bottle 3, such as a polyethleneterephthalate (PET) bottle. The typical plastic beverage bottle 3 includes a light-transmissible bottle body 30 formed with an externally threaded mouth 31. The flashlight 1 includes a barrel 11, a reflector 12, a lamp 13, a conductor unit, a coupling sleeve 15, and a lens piece 16.

The barrel 11 has a front barrel portion 111 that defines a front receiving space 116, and a rear barrel portion 112 that is connected to the front barrel portion 111 and that defines a rear receiving space 118 adapted for receiving a battery unit 2, as shown in FIG. 3. In this embodiment, the front barrel portion 111 has a front end formed with an externally threaded surface 117. The rear barrel portion 112 has a rear end provided with a hanger ring 113 thereon. The battery unit 2 has a first battery terminal 21 and a second battery terminal 22 opposite to the first battery terminal 21, as best shown in FIG. 3.

The reflector 12 is disposed in the front receiving space 116 of the front barrel portion 111. In this embodiment, the reflector 12 has a tubular conducting portion 122, and a diverging reflecting portion 121 connected to the tubular conducting portion 122. In this embodiment, the diverging reflecting portion 121 has an inner surface formed with a silver-plating layer (not shown).

The lamp 13 is disposed in the reflector 12. In this embodiment, the lamp 13 has an inner lamp terminal 131 that is adapted to contact electrically the first battery terminal 21, and an outer lamp terminal 132 that surrounds the inner lamp terminal 131 and that engages and contacts electrically the tubular conducting portion 122 of the reflector 12, as shown in FIG. 3.

The conductor unit is disposed in the barrel 11 and is adapted to establish electrical connection between the lamp 13 and the battery unit 2. In this embodiment, the conductor unit includes a conducting plate 14, a conducting strip 17, and a switch member 115, as shown in FIG. 3. The conducting plate 14, which is made of metal, is mounted in the front receiving space 116 of the front barrel portion 111, and is formed with a mounting hole 141. The tubular conducting portion 122 of the reflector 12 extends through the mounting hole 141 and contacts electrically the conducting plate 14. The conducting strip 17 has a first strip portion 171 connected electrically to the conducting plate 14, and a second strip portion 172 adapted to connect electrically with the second battery terminal 22. The switch member 115 is mounted on the barrel 11, is connected electrically to the first and second strip portions 171, 172 of the conducting strip 17, and is operable so as to make or break electrical connection between the first and second strip portions 171, 172.

The coupling sleeve 15 has a front coupling section 152 formed with an internally threaded surface 1521 that is adapted to engage the externally threaded mouth 31 of the bottle body 30, a rear coupling section 154 formed with an internally threaded surface 1541 and mounted threadedly on the front end of the front barrel portion 111 via engagement between the externally threaded surface 117 of the front end of the front barrel portion 111 and the internally threaded surface 1541 of the rear coupling section 154, and an intermediate section 153 interconnecting the front and rear coupling sections 152, 154. In this embodiment, the intermediate section 153 has an inner diameter less than those of the front and rear coupling sections 152, 154, and defines a lens mounting hole 157 that has a large-diameter hole portion 156 proximate to the rear coupling section 154, and a small-diameter hole portion 155 proximate to the front coupling section 152, as best shown in FIG. 2.

The lens piece 16 is mounted in the intermediate section 153 of the coupling sleeve 15. In this embodiment, the lens piece is disposed in the large-diameter hole portion 156 of the lens mounting hole 157 in the intermediate section 153. It is noted that the front barrel portion 111 has an inner diameter substantially smaller than a diameter of the lens piece 16 so as to prevent movement of the lens piece 16 away from the large-diameter hole portion 156 of the lens mounting hole 157 in the intermediate section 153. The diverging reflecting portion 121 of the reflector 12 can direct light radiated by the lamp 13 toward the lens piece 16. In this embodiment, the lens piece 16 is a colorless condenser lens. Alternatively, a colored condenser lens, such as a red, blue, green or purple lens piece, can be used in this embodiment. Moreover, the lens piece 16 is preferably formed with light guiding portions 161, 162 on one side thereof for light convergence purposes.

Due to the combination of the flashlight 1 and the plastic beverage bottle 3, light generated by the flashlight 1 passes through the colored bottle body 30 so that the aforesaid combination can serve as a signaling torch.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A flashlight adapted for use with a plastic beverage bottle that includes a light-transmissible bottle body formed with an externally threaded mouth, said flashlight comprising:

a barrel having a front barrel portion that defines a front receiving space, and a rear barrel portion that is connected to said front barrel portion and that defines a rear receiving space adapted for receiving a battery unit;

a reflector disposed in said front receiving space of said front barrel portion;

a lamp disposed in said reflector;

a conductor unit disposed in said barrel and adapted to establish electrical connection between said lamp and the battery unit;

a coupling sleeve having a front coupling section formed with an internally threaded surface that is adapted to engage the externally threaded mouth of the bottle body, a rear coupling section mounted securely on said front barrel portion, and an intermediate section interconnecting said front and rear coupling sections; and a lens piece mounted in said intermediate section of said coupling sleeve.

2. The flashlight as claimed in claim 1, the battery unit having a first battery terminal and a second battery terminal opposite to the first battery terminal, wherein:

said lamp has an inner lamp terminal that is adapted to contact electrically the first battery terminal, and an outer lamp terminal that surrounds said inner lamp terminal;

said reflector having a tubular conducting portion that engages and that contacts electrically said outer lamp terminal;

said conductor unit including
   a conducting plate mounted in said front receiving space of said front barrel portion and formed with a mounting hole, said tubular conducting portion of said reflector extending through said mounting hole and contacting electrically said conducting plate, and
   a conducting strip having a first strip portion connected electrically to said conducting plate and a second strip portion adapted to connect electrically with the second battery terminal.

3. The flashlight as claimed in claim 2, wherein said conductor unit further includes a switch member mounted on said barrel, connected electrically to said first and second strip portions of said conducting strip, and operable so as to make or break electrical connection between said first and second strip portions.

4. The flashlight as claimed in claim 1, wherein said intermediate sect ion of said coupling sleeve has an inner diameter less than those of said front and rear coupling sections and defines a lens mounting hole that has a large-diameter hole portion proximate to said rear coupling section, and a small-diameter hole portion proximate to said front coupling section, said lens piece being disposed in said large-diameter hole portion.

5. The flashlight as claimed in claim 1, wherein said reflector further has a diverging reflecting portion connected to said tubular conducting portion for directing light radiated by said lamp toward said lens piece.

6. The flashlight as claimed in claim 1, wherein said rear coupling section of said coupling sleeve is mounted threadedly on said front barrel portion.

7. The flashlight as claimed in claim 1, wherein said lens piece is a condenser lens.

8. The flashlight as claimed in claim 7, wherein said lens piece is a colorless lens.

9. The flashlight as claimed in claim 7, wherein said lens piece is a colored lens.

* * * * *